Figure 1:
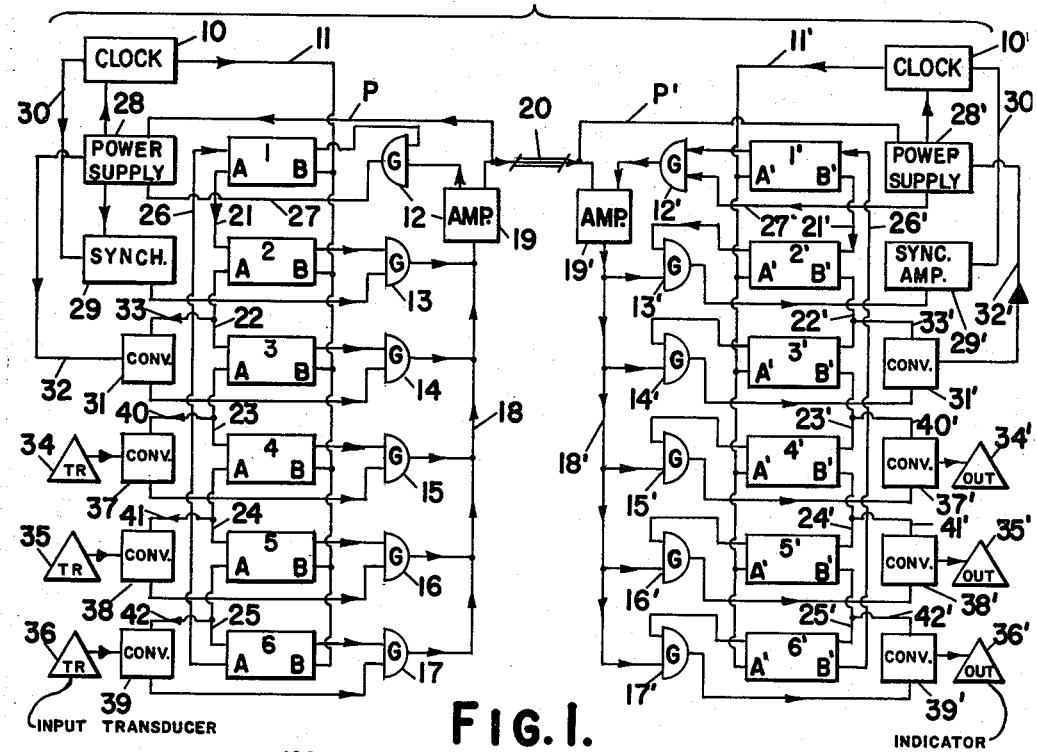

May 5, 1964            J. L. PENTER            3,132,329

TIME DIVISION TELEMETERING APPARATUS

Filed April 20, 1961

INVENTOR.
JOHN L. PENTER
BY Elliott & Pastoriza
ATTORNEYS

3,132,329
TIME DIVISION TELEMETERING APPARATUS
John L. Penter, 13752 Valley Heart, Sherman Oaks, Calif.
Filed Apr. 20, 1961, Ser. No. 104,277
5 Claims. (Cl. 340—183)

This invention relates to an improved telemetering apparatus designed particularly for the transmission of information from the bottom of an oil well to the surface of the well.

Present day telemetering systems usually transmit information in the form of amplitude modulated signals. The transmitter station will ordinarily include suitable transducers for providing a signal varying in amplitude in accordance with a given physical condition such as temperature, pressure, and the like. The receiver station will include suitable demodulated circuits to provide an output signal indicative of the physical quantity being measured.

Where several quantities are measured simultaneously, it is common practice to employ some type of multiplexing system wherein the information signals indicative of the quantities are simultaneously transmitted over a single line or channel. Such systems require filters or equivalent electrical components for separating the individual signals after reception.

In the case of telemetering information from the bottom of bore holes such as oil wells, special problems are encountered. First, it is desirable to be able to transmit several different pieces of information over a single transmitting medium which, for practical purposes, is available in the form of a single cable ordinarily employed for supporting other equipment. For bore holes several thousand feet in depth, however, the corresponding length of the cable results in large impedance changes over its length and thus large changes in the amplitude of signals transmitted over the cable may occur independently of changes in the physical quantities being measured.

Another problem in bore holes results in relatively high temperatures which seriously affect the operation of electrical equipment lowered into the bore hole. For example, even highly regulated power supplies will not remain regulated under high temperatures because the regulating elements themselves will not properly operate above certain temperature limits. As a consequence, poor voltage regulation in the power supply can result in inaccuracy in the transmitted signals.

With the foregoing considerations in mind, it is a primary object of this invention to provide a greatly improved telemetering apparatus which is particularly well adapted for use in oil well bore holes for telemetering information indicative of certain physical conditions within the bore hole in a manner which overcomes the above noted problems.

More particularly, it is an object to provide an improved telemetering apparatus in which the information signals can be converted into quantities which are independent of impedance changes in the transmitting cable.

Another equally important object is to provide a unique telemetering apparatus in which the entire supply for the transmitting components is automatically regulated from the receiver apparatus to the end that variations in the information signals as a consequence of poor power supply regulation are avoided.

Another more general object of this invention is to provide an improved telemetering apparatus in which the value of physical quantities at the transmitter station may be more accurately reproduced at the receiving station than has heretofore been possible with known telemetering equipment.

Briefly, these and other objects and advantages of this invention are attained by providing a transmitting means for transmitting information signals in response to physical conditions in the form of time modulated pulses during successive time intervals over a single transmission cable. A receiving means is provided for receiving and converting the time modulated pulses to quantities indicative of said physical conditions. By employing time modulated pulses, amplitude variations as a consequence of impedance changes over the transmission cable have no effect on the accuracy of the output reading.

In accordance with an important feature of this invention, a transmitter power supply is provided for the transmitter apparatus and is arranged to receive power over the transmission cable. The receiver apparatus includes a master power supply for passing power over the transmission cable to the transmitter power supply. In addition, there is provided means for passing a sensor signal indicating the output of the transmitter power supply to the receiver power supply together with means for passing a regulating signal from the receiver power supply which is responsive to the sensor signal to the transmitter power supply for regulating the output of the transmitter power supply. The resulting feedback loop insures automatic operation so that the output power from the transmitter power supply will be highly regulated at all times. Since the regulating components themselves are disposed at the receiver apparatus, they will not be subject to the extreme environmental conditions to which the transmitter apparatus is subject, and thus excellent power supply regulation is attained.

Figure 2:
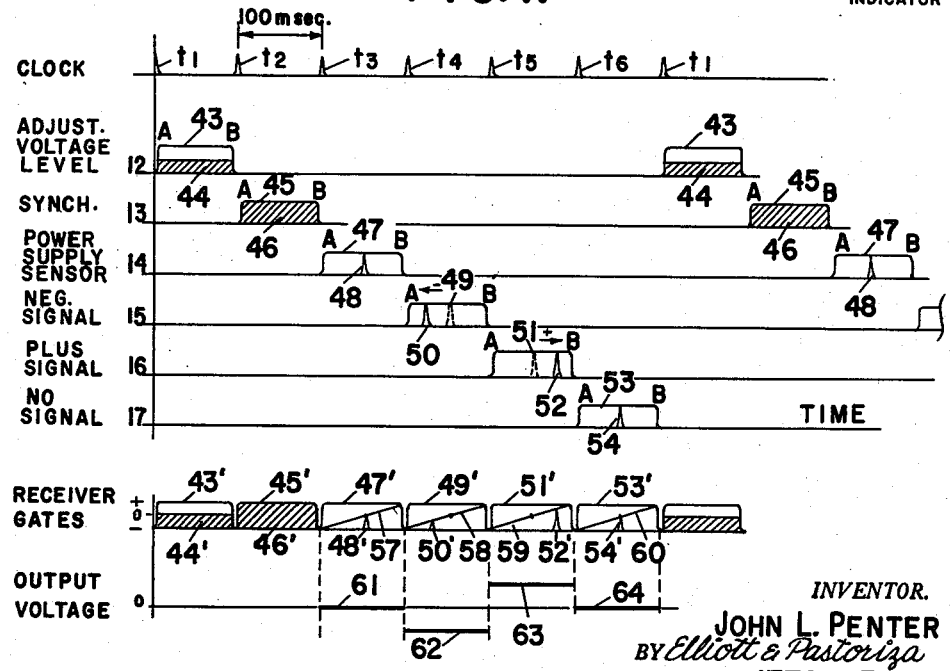

A better understanding of the invention as well as various further features and advantages thereof will be had by referring to an exemplary embodiment as illustrated in the accompanying drawings, in which:

FIGURE 1 is a block diagram illustrating the basic components of the transmitter and receiver apparatus in accordance with the invention; and, FIGURE 2 is a series of time graphs illustrating various events taking place in the components of FIGURE 1 useful in explaining the operation of the apparatus.

Referring first to FIGURE 1, there is shown to the left of the drawing a transmitting system including a clock 10 for generating a series of uniformly spaced pulses. As shown, the output of the clock connects through a common lead 11 to a plurality of switch means, which in the particular embodiment chosen for illustrative purposes, may comprise "flip-flop" circuits respectively designated 1, 2, 3, 4, 5, and 6. The respective sides of the flip-flop circuits are designated by the letters A and B.

The various flip-flop circuits are respectively connected to a plurality of electrical gates G designated by the numerals 12, 13, 14, 15, 16, and 17. The outputs of the gates 13 through 17 connect to a common output lead 18. Lead 18 passes to an output amplifier 19 connected to a transmisison cable 20. The flip-flop or switching circuits themselves are connected in a ring as by conductor 21 passing from the flip-flop circuit 1 to the flip-flop circuit 2, the conductor 22 passing from the flip-flop circuit 2 to the flip-flop circuit 3, and so forth through conductors 23, 24, 25, and 26 which latter conductor passes from flip-flop circuit 6 back to the first flip-flop circuit 1. By this ring type connection, operation of one of the flip-flop circuits to close the gate to which it is connected will pass a trigger signal through the conductor passing to the next flip-flop circuit to place that flip-flop circuit in a ready condition for actuation by the next clock pulse so that the plurality of switches are sequentially operated, one flip-flop circuit readying the next for operation by the clock pulse.

With the foregoing arrangement, it is possible to effect successive opening and closing of the various gates in a manner to define discrete successive time channels which periodically repeat after the last of the plurality of gates has been opened and closed. There is thus provided a time division system in which an overall period of time is divided into six discrete channels. These channels are employed for transmitting various different pieces of information over the cable 20.

In addition to the above components there is also provided a lead 27 connecting from the output of the gate 12 to a transmitter power supply 28. This lead 27 passes a regulating signal to the power supply whenever the gate 12 is open for regulating the power output thereof as will become clearer when the operation of the system is described. Actual power for the power supply 28 is received from a power line P connected directly to the cable 20.

A synchronizing signal generating means 29 is connected to the clock 10 for receiving a synchronizing signal therefrom as through the lead 30. This synchronizing signal is applied directly to the gate 13 as shown, so that when the gate 13 is open, the synchronizing signal will be passed to the output line 18.

The gate 14 is connected to receive a sensor signal from a sensor signal generating means 31 receiving a sample output of the power supply 28 through a lead 32. The generated sensor signal is passed to the output lead 18 whenever the gate 14 is open. The remaining components include a plurality of transducer means including transducers 34, 35, and 36, converting circuits 37, 38, and 39, and triggering leads 40, 41, and 42.

The transducers 34, 35, and 36 are responsive to different physical conditions such as the temperature, resistance, radiation, or any other physical parameter in the environment of an oil well bore hole which it is desired to measure. These transducers will provide an electric output signal which is a function of the value of the physical condition it is designed to measure. The output signals in turn are fed to the respective control circuits 37, 38, and 39 which convert the signals to information signals in the form of time modulated pulses. To provide a time modulated pulse in accordance with a given magnitude received in the control circuit requires a reference timing trigger pulse which is supplied through the various trigger leads 40, 41, and 42 from the respective ring series leads 23, 24, and 25 between the associated flip-flop circuits 4, 5, and 6.

The information signals in the form of time modulated pulses are passed to the gates 15, 16, and 17 respectively and will have a time position within the channels defined by these gates in accordance with the physical condition or quantity being measured by the transducers 34, 35, and 36.

All of the signals received on the common output line 18 are passed through the output amplifier 19 to the transmission cable 20.

Referring now to the right hand portion of FIGURE 1, there is shown a receiver system wherein various components constituting a counterpart to the components described in the transmitter system are designated by the same numerals followed by a prime ('). Thus, there is shown a clock 10' generating a series of uniformly spaced pulses on an output lead 11' connecting respectively to a series of flip-flop circuits 1', 2', 3', 4', 5', and 6'. The respective sides of these flip-flops are designated by the letters A' and B'.

As in the case of the transmitter system, the various flip-flops 1' through 6' are connected in a ring by a series of conductors 21', 22', 23', 24', 25', and 26' so that they will successively trigger each other to a ready condition to operate a plurality of gates 12', 13', 14', 15', 16', 17', upon reception of successive clock pulses in a manner to define discrete successive time divisions or channels. Incoming signals from the transmission cable 20 are received through an amplifier 19' connected to a common input lead 18' connecting to the gates 13' through 17'. The gate 12' passes a regulating control voltage over lead 27' from the receiver power supply 28. Power for the transmitter power supply lead P is derived from the receiver power supply 28' over power lead P'.

The synchronizing signal from the transmitter gate 13 is received in the receiver gate 13' and passed through a synchronizing signal amplifier 29' and lead 30' to the clock 10'. This signal serves to hold the clock 10' in correct time synchronism with the clock 10.

Similarly, the sensor signal from the gate 14 in the transmitter system is received in the gate 14' of the receiver system and thence through a receiver converting circuit 31' and lead 32' to the receiver power supply 28'. The regulating signal is passed from the receiver power supply 28' through gate 12' as noted above for transmission on cable 20 to the input of the gate 12 in the transmitter system and thence through lead 27 to the transmitter power supply 28 for regulating the same in accordance with the sensor signal.

The various information signals are received in the respective gates 15', 16', and 17'. From these gates, the information signals pass through receiver converting circuits 37', 38', and 39' which will convert the time modulated pulses into output quantities detectible by suitable indicators 34', 35', and 36' for indicating the particular physical condition being measured.

The operation of the overall system will now be described with reference to FIGURE 2. Referring first to the uppermost graph, there are shown a series of uniform time pulses designated t1, t2, t3, t4, t5, and t6 representing the output from the clock 10. Reception of these successive time pulses in the flip-flop circuits 1 through 6 will effect triggering of the same to successively actuate the various gates 12 through 17. The arrangement is such that the gates 12 through 17 will be successively opened and closed as a consequence of the series ring connection between the various flip-flops, the actuation of one flip-flop serving to ready the next for operation upon receipt of the next successive timing pulse from the clock. The gates are thus successively opened as pictorially represented on the time lines designated by corresponding numerals 12, 13, 14, 15, 16, and 17. For example, with respect to the first gate 12 of FIGURE 1, there is defined a time channel designated 43 in FIGURE 2 during which time a signal represented by the shaded area in the form of a square pulse 44 of given amplitude which tends towards zero is passed to lead 27 and the power supply 28. The magnitude of the signal will serve to regulate the output of the power supply 28 to maintain its output at a certain value, which, when attained, minimizes the value of the regulating signal.

The next gate 13 defines a channel 45 shown in line 13 of FIGURE 2 during which time a synchronizing signal indicated by the shaded portion 46 is passed. The next gate defines a time channel 47 including a power supply sensor signal 48 which, as shown, occupies the middle of the channel. If the output of the power supply changes in a positive direction from a desired given value, the time position of the signal 48 will shift to the right within the time channel 47. If the power supply output should drop, the sensor signal 48 will shift to the left. This shifting is achieved by the control circuit 31 which may, for example, constitute a magnetic amplifier initially placed in a ready condition by a trigger pulse from the lead 33 corresponding to the initiation of the time channel. The time position of the sensor pulse 48 is determined by the magnitude of the particular signal change received by the control circuit from the power supply.

The remaining gates 15, 16, and 17 define corresponding time channels as indicated in FIGURE 2 at 49, including an information signal 50, 51 including an information signal 52, and 53 including an information signal 54. The converting circuits 37, 38, and 39 in FIGURE 1 as described heretofore will serve to position the information signals 48, 50, and 52 in time in accordance with the magnitude of the signals from the transducers 34, 35, and 36, respectively. Thus, the control circuits 37, 38, and 39 may be similar in operation to the control circuit 31, the same being triggered at the initiation of the time channels by the trigger leads 40, 41, and 42, the time of generation of the information pulse being determined by the magnitude of the input signal received in the control circuit.

At the end of the six channels, the successive channel sequence repeats as shown partially to the right of FIGURE 2 so that a successive sampling of the various signals to be transmitted takes place in a sequential manner. If the frequency of the pulses from the clock 10 is 10,000 kilocycles per second, the widths of the respective channels will be 100 microseconds.

Referring now to the lower time plots, there are indicated receiver channels corresponding to the channels defined in the transmitter system, the corresponding numerals being primed. Thus, the receiver gate 12', when in its "on" condition, defines the channel 43 and will pass a regulating signal 44' from the lead 27' all as described heretofore. The gate 13' defines a time channel 45' receiving the synchronizing signal 46'. The gate 14' defines a time channel indicated at 47' for receiving the sensor time modulated pulse 48'. Similarly, the remaining gates define channels 49', 51', and 53', each incorporating the information pulses 50', 52', and 54'.

As shown in FIGURE 2, the operation of the various receiver converter circuits are depicted by graphic representation of the outputs of ramp or sawtooth generators such as indicated by the numerals 57, 58, 59, and 60. The arrangement is such that the magnitude of the voltage on the respective ramps 57 through 60 will be transmitted to the outputs of the converter circuits only at the time when a particular information pulse is received.

For example, the system is designed such that zero volts will be passed by the outputs when an information pulse, such as the sensor pulse 48, is in the exact center of the time channel. The ramp 57 thus extends from a negative voltage value through zero to a positive voltage value, and at zero, the position on the ramp will correspond to the center of the channel. Therefore, when the pulse 48' is received at the center of the channel, no voltage output from the receiver converter circuit 31', shown in FIGURE 1, will be received and the regulating voltage signal 43 from the power supply 28' provided on the line 27' will approach zero. However, should the value of the output of the transmitter power supply 28 of FIGURE 1 vary to shift the pulse to the left or right, the corresponding negative or positive signal from the ramp voltage 57 will be passed to the power supply to provide a regulating voltage signal which will pass to the gate 12' at the proper time interval to regulate the power supply 28.

The point in time of the occurrence of the information pulses 50', 52', and 54' will similarly result in a voltage from the corresponding ramps 58, 59, and 60 to appear in the indicators 34', 35', and 36'. For example, the information pulse 50 is to the left of the center portion of the channel and thus indicates a negative voltage which is derived from the ramp 58 which is negative to the left of the center of the channel. The information pulse 53, on the other hand, is to the right of the center of the channel and thus will provide a positive voltage as indicated by the value of the voltage on the ramp 59 to the right of the center of the channel. Finally, the information pulse 54 is in a central position so that no voltage will be derived from the ramp 60. The output voltage levels which may be individually detected for the respective channels are indicated at 61, 62, 63, and 64.

The various receiver converting circuits by thus incorporating a simple ramp or sawtooth generator provide a simple means for converting the time modulated pulse signals into analog or amplitude modulated output signals.

It will be evident from the foregoing that as the clock pulses continue, the channels will be respectively swept through in a very rapid manner so that the information derived from the various channels will appear to be continuously provided.

Further, it will be evident that as a consequence of the use of time modulated pulses, great accuracy is achieved during the transmission since any changes of impedance in the transmission cable 20 will not affect the time positioning of the information pulses.

Finally, and of considerable importance, is the fact that the power supply 28 in the transmitter portion is regulated each cycle of the entire sweep during the channel time 43 so that a constant power output is maintained thus insuring proper positioning of the time modulated signals and proper triggering of the various circuits.

From the foregoing description, it will thus be evident that the present invention has provided a greatly improved telemetering apparatus in which several pieces of information may be transmitted over a single transmission medium and in which regulation is effectively continuously taking place so that extreme environmental conditions will not appreciably affect the fidelity of the information transmitted.

Changes falling within the scope and spirit of this invention will occur to those skilled in the art. The time division telemetering apparatus is, therefore, not to be thought of as limited to the one embodiment set forth merely for illustrative purposes.

What is claimed is:

1. A time division telemetering apparatus comprising, in combination: means for generating information signals in the form of pulses having positions in time determined by given physical conditions; transmitting means for transmitting said information signals during successive time intervals over a signal transmission medium; a transmitter power supply for said transmitting means; receiving means for respectively successively receiving said information signals during corresponding successive time intervals; converting means for converting said information signals into signals indicative of said physical conditions; a receiver power supply; means for passing a sensor signal indicating the output of said transmitter power supply to said receiver power supply; and means for passing a regulating signal from said receiver power supply responsive to said sensor signal to said transmitter power supply for regulating the output of said transmitter power supply.

2. A time division telemetering apparatus comprising, in combination: a transmitter system including: transmitter generating means for defining successive time channels; transducer means for generating information signals in accordance with given physical conditions to be measured for respective transmission within said successive time channels, said information signals being in the form of pulses time modulated within said respective channels in accordance with changes in said given physical conditions; a single transmission medium successively receiving said information signals; a transmitter power supply for energizing said generating and transducer means; and a receiver system including: receiver generating means for defining successive time channels for respectively receiving therewithin said information signals from said transmission medium; converting means for converting said information signals into quantities that are indicative of said given physical condition; a receiver power supply connected through said transmission medium to energize said transmitter power supply; and feedback means connected to said transmitter power supply providing a sensor signal for transmission over said transmission medium to said receiver power supply for generating a regulating signal passed to said transmitter power supply so that power from said transmitter power supply is maintained substantially constant.

3. A time division telemetering apparatus according to claim 2, in which said transmitter generating means includes synchronizing signal means for passing synchronizing signals to said receiver generating means whereby said successive time channels in said transmitter system are synchronized with said successive time channels in said receiver system.

4. A time division telemetering apparatus comprising, in combination: a transmitter system including: a transmitter clock for generating a series of uniformly spaced pulses; a plurality of electrical gates; a plurality of switch means connected to receive said series of pulses and connected to said gates to effect successive opening and closing of said gates to define discrete, successive time channels which periodically repeat after the last of said plurality of gates has been opened and closed; a common output lead from said gates; a transmission cable receiving signals on said output lead; a transmitter power supply connected to receive power from said transmission cable; a synchronizing signal generator connected to said transmitter clock for generating a synchronizing signal; a power supply sensor electrically connected to said power supply for generating a sensor signal which is a function of changes in the power developed by said power supply; and a plurality of transducer means for generating plurality of information signals constituting functions of given physical conditions for which said transducers are respectively designed to measure, said synchronizing, sensor, and information signals being respectively received in said plurality of gates for transmission to said transmission cable within the corresponding time channels of the gates; and a receiver system including: a receiver clock for generating a series of uniformly spaced pulses; a plurality of electrical gates; a plurality of switch means connected to receive said series of pulses and connected to said gates to effect successive opening and closing of said gates ot define discrete, successive time channels which periodically repeat after the last of said plurality of gates has been opened and closed; a common input lead connected to said gates and connected to receive signals from said transmission cable; a receiver power supply connected to pass power to said transmission cable for said transmitter power supply; a synchronizing signal amplifier connected to said receiver clock; a sensor signal control circuit connected to said receiver power supply; and a plurality of converting circuit means, said synchronizing signal amplifier, sensor signal control circuit, and plurailty of converting circuit means respectively receiving signals from said gates, said synchronizing signal amplifier passing a signal to said receiver clock in accordance with said synchronizing signal in said transmitter system to maintain said receiver clock in synchronism with said transmitter clock whereby said time channels defined by the gates in said receiver system are in synchronism with said time channels defined by the gates in said transmitter system, said sensor signal control circuit passing a signal to said receiver power supply in accordance with said sensor signal in said transmitter system to provide a regulating signal passed to said transmitter power supply over said transmission cable whereby said transmitter power supply is maintained substantially constant; and said converting circuit means reproducing signals indicative respectively of said physical conditions.

5. A time division telemetering apparatus according to claim 4, in which each of said transducer means includes a control circuit providing the information signal in the form of a pulse modulated in time by the physical condition with which said information signal is associated within the limits of the respective channel so that the time position of the pulse within said channel is a function of the value of said physical condition, each of said converting circuit means including a converting circuit responsive to the time position of the corresponding information pulse received for providing an output signal whose magnitude is a function of said time position whereby information transmitted from said transmitter system to said receiver system is independent of changes in the amplitude of said information signals.

References Cited in the file of this patent
UNITED STATES PATENTS

| | | |
|---|---|---|
| 122,437 | Chester | June 2, 1872 |
| 1,721,492 | Wurst | July 16, 1929 |
| 2,446,819 | Fyler | Aug. 10, 1948 |
| 2,678,998 | Young | May 18, 1954 |